United States Patent [19]

Patel

[11] Patent Number: 5,222,240

[45] Date of Patent: Jun. 22, 1993

[54] METHOD AND APPARATUS FOR DELAYING WRITING BACK THE RESULTS OF INSTRUCTIONS TO A PROCESSOR

[75] Inventor: Piyush G. Patel, Fremont, Calif.

[73] Assignee: Intel Corporation, Santa Clara, Calif.

[21] Appl. No.: 479,627

[22] Filed: Feb. 14, 1990

[51] Int. Cl.$^5$ .................. G06F 9/312; G06F 9/38
[52] U.S. Cl. .................... 395/775; 395/375
[58] Field of Search .................. 395/775, 375; 364/231.8, 736

[56] References Cited

U.S. PATENT DOCUMENTS

| | | | |
|---|---|---|---|
| 4,734,852 | 3/1988 | Johnson et al. | 395/250 |
| 4,926,323 | 5/1990 | Baror et al. | 395/375 |
| 5,123,097 | 6/1992 | Joyce et al. | 395/375 |
| 5,148,529 | 9/1992 | Ueda et al. | 395/375 |

Primary Examiner—Dale M. Shaw
Assistant Examiner—D. Dinh
Attorney, Agent, or Firm—Blakely, Sokoloff, Taylor & Zafman

[57] ABSTRACT

The present invention describes an integer execution unit register file having one fewer write port by employing delayed writeback for data transfer instructions in a high speed processor. The integer execution unit comprises a register file with 32 separate registers, each 32-bits long. The register file is a write through register file. A four-stage instruction pipeline is employed to execute all integer instructions. The four stages are (1) Fetch, (2) Decode, (3) Execute, and (4) Writeback. For data transfer type of instructions such as, a load instruction, one extra instruction stage is usually required. The prior art processors add one extra write port to accommodate such data transfer type of instructions. The present invention delays the writing of the data transfer type instruction until the writeback stage of the next data transfer instruction. The result of the data transfer type instruction returns at the end of the writeback stage. The result is held in a temporary register. All references to the result of such a data type transfer instruction will be bypassed from the temporary register to the proper execution block. The data from the temporary register is written back into the register file only at the writeback stage of the next data transfer type instruction. Thus, the present invention resolves the conflict of resources for the write port and at the same time saves one port to the register file. The present invention not only reduces the amount of silicon area required for high speed processors, it also reduces the layout complexity. It follows that the present invention improves the overall speed of the processor.

7 Claims, 6 Drawing Sheets

FIG. 4
ADD PIPELINE DIAGRAM
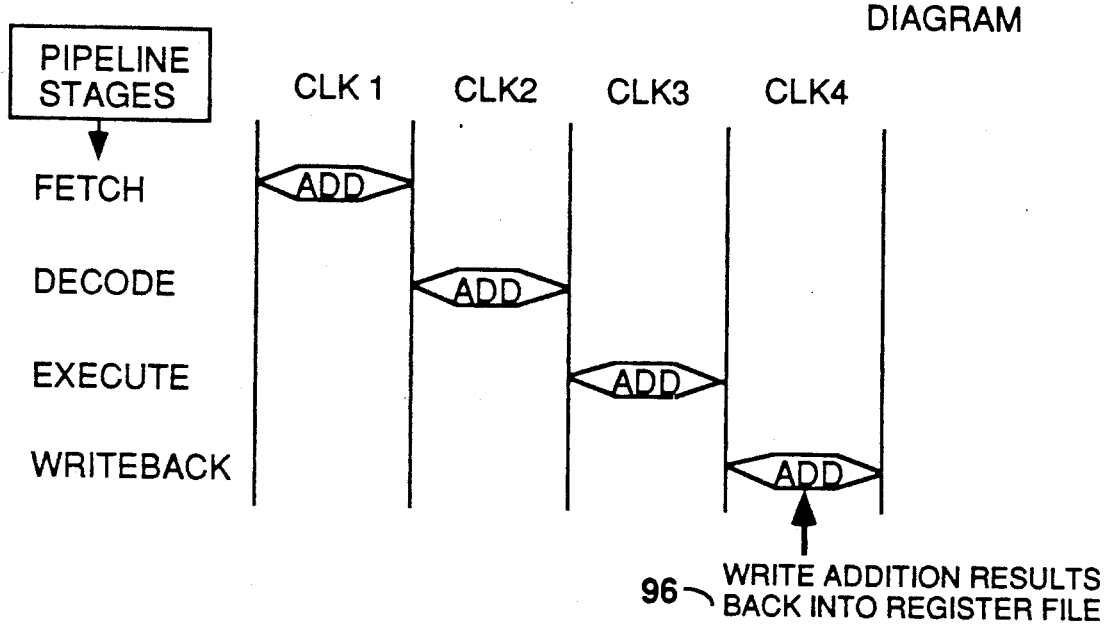
FIG. 5 LOAD PIPELINE DIAGRAM
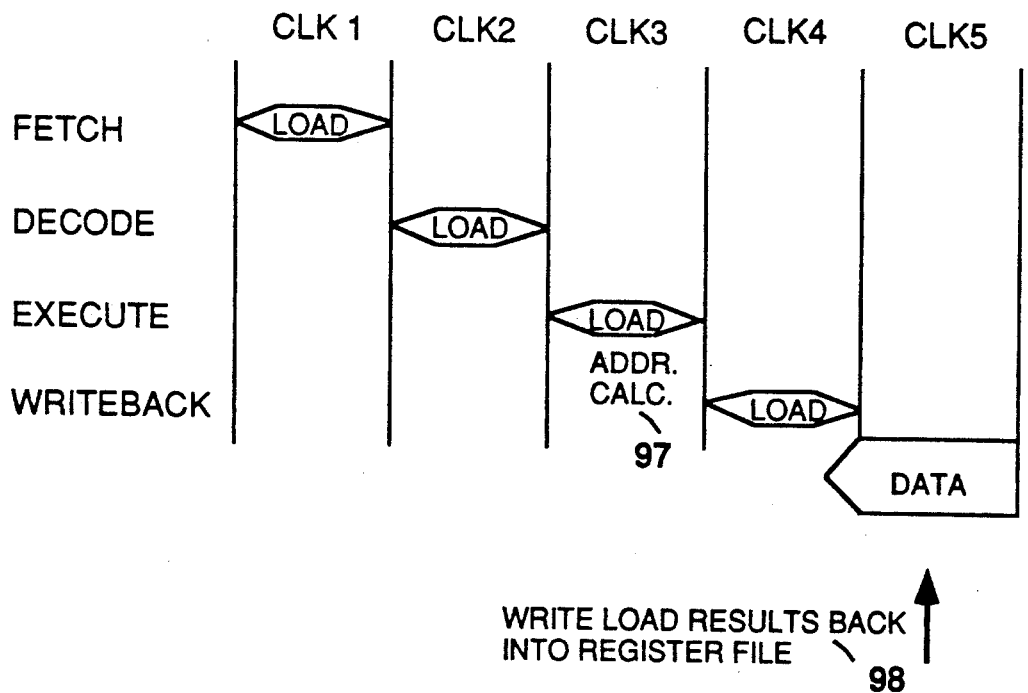

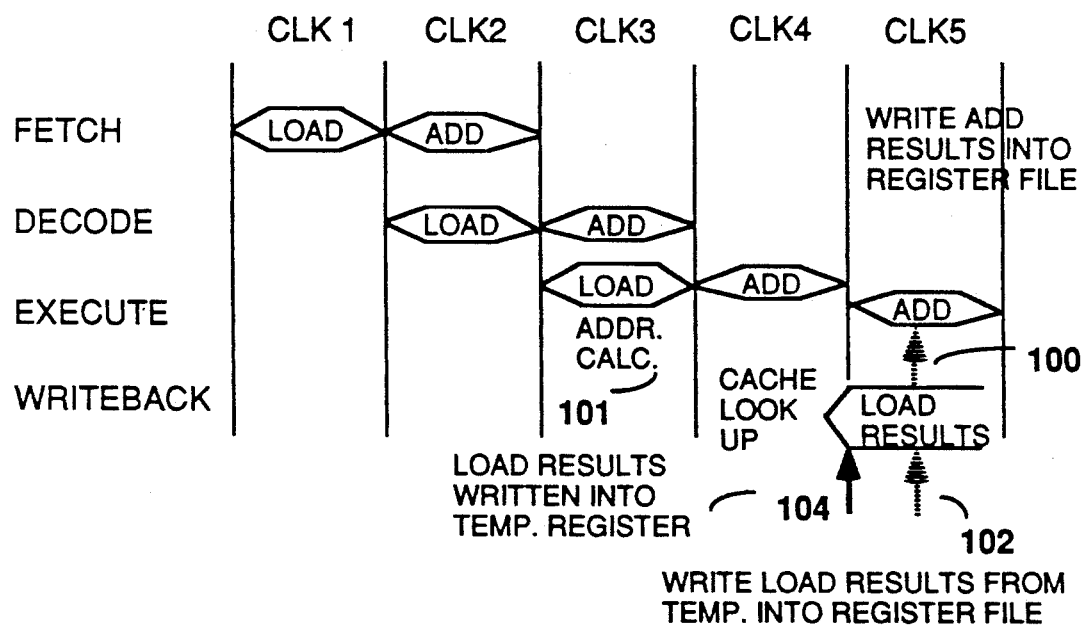
FIG. 6 LOAD & ADD DIAG. UNDER THE INVENTION

METHOD AND APPARATUS FOR DELAYING WRITING BACK THE RESULTS OF INSTRUCTIONS TO A PROCESSOR

BACKGROUND OF THE INVENTION

1. Field of the Invention

The present invention relates to digital computation circuits and, more particularly, to an integer execution unit having one fewer write port for use with a high-speed microprocessor.

2. Art Background

The heart of any computer or microprocessor is the processor itself. One primary function of any processor is its ability to perform arithmetical or logical operations on various inputs to the processor. The inputs to the processor may include instructions, integers, or addresses. Various schemes are known in the prior art to provide such arithmetic and/or logical operation efficiently. Throughout the development of processors, the emphasis has constantly been placed on increasing the speed of the operation of the processor and components within such processors. Another approach has been directed towards reducing the complexity of the instructions. Yet another approach has been to reduce the actual number of components such as transistors on the processor itself.

Because many mathematical or logical operations performed by a processor involve iterative computation by the integer execution unit, the more recent processors implement a number of simultaneous parallel operations in order to decrease the actual iterative cycle. These simultaneous parallel operations are often referred to as instruction pipeline stages. For example, in one prior art scheme, in carrying out addition operations of two binary numbers, the integer execution units provide for a pair of read ports and a pair of write ports, thus permitting the simultaneous reading and writing of the addition instruction. In a different scheme, the more recent processors utilize the parallel operation technique. The integer execution unit provides for 5 read ports and 8 write ports.

It is to be appreciated that any time savings which can be obtained in any of the arithmetic or logical operations performed by the integer execution unit, will ultimately result in a decrease in the over-all computation time for a given processor. Having multiple read and write ports in the integer execution units allows the simultaneous parallel operations in order to decrease the actual iterative cycle. However, the large number of transistors required to implement a multiple read and write port in the integer execution unit contributes to the complexity of the processor. Accordingly, any decrease in the time required to perform the arithmetic or logical operations by the integer execution unit without requiring the addition of extra write ports in a processor will improve the over-all speed of the processor.

SUMMARY OF THE INVENTION

The present invention describes an integer execution unit register file having one fewer write port by employing delayed writeback for data transfer instructions in a high speed processor. The integer execution unit comprises a register file with 32 separate registers, each 32-bits long. The register file is a write through register file which reads data from a register at the same time that data is written onto the same register. A four-stage pipeline is employed to execute all integer instructions. The four stages are (1) Fetch, (2) Decode, (3) Execute, and (4) Writeback. For data transfer type of instructions such as a load instruction, one extra instruction pipeline stage is usually required. The prior art processors add one extra write port to accommodate such data transfer type of instructions. The present invention delays the writing of the data transfer type instruction until the writeback stage of the next data transfer instruction. The result of the data transfer type instruction returns at the end of the writeback stage. The result is held in a temporary register. All references to the result of such a data type transfer instruction will be bypassed from the temporary register to the proper execution block. The data from the temporary register is written back into the register file only at the writeback stage of the next data transfer type instruction. Thus, the present invention resolves the conflict of resources for the write port and at the same time saves one port to the register file. The present invention not only reduces the amount of silicon area required for high speed processors, it also reduces the layout complexity. It follows that the present invention improves the overall speed of the processor.

BRIEF DESCRIPTION OF THE DRAWINGS

FIG. 4 is a timing diagram of a simple arithmetic instruction being executed as it goes through the four-stage instruction pipeline utilized in the preferred embodiment of the present invention.

FIG. 5 is a timing diagram of a data transfer type instruction as it is being executed through the four-stage instruction pipeline utilized in the preferred embodiment of the present invention.

FIG. 6 is a timing diagram of an arithmetic type instruction and a data transfer type instruction as they proceed through the four-stage instruction pipeline used in the preferred embodiment of the present invention.

DETAILED DESCRIPTION OF THE INVENTION

An integer execution unit register file having one fewer write ports is described for improving the overall speed of the processor. In the following description, numerous specific details are set forth such as specific circuits, interconnections, etc., in order to provide a thorough understanding of the present invention. It will be obvious, however, to one skilled in the art that the present invention may be practiced without these specific details. In other instances, well-known structures and methods have not been disclosed in detail in order not to unnecessarily obscure the present invention.

Figure 1:
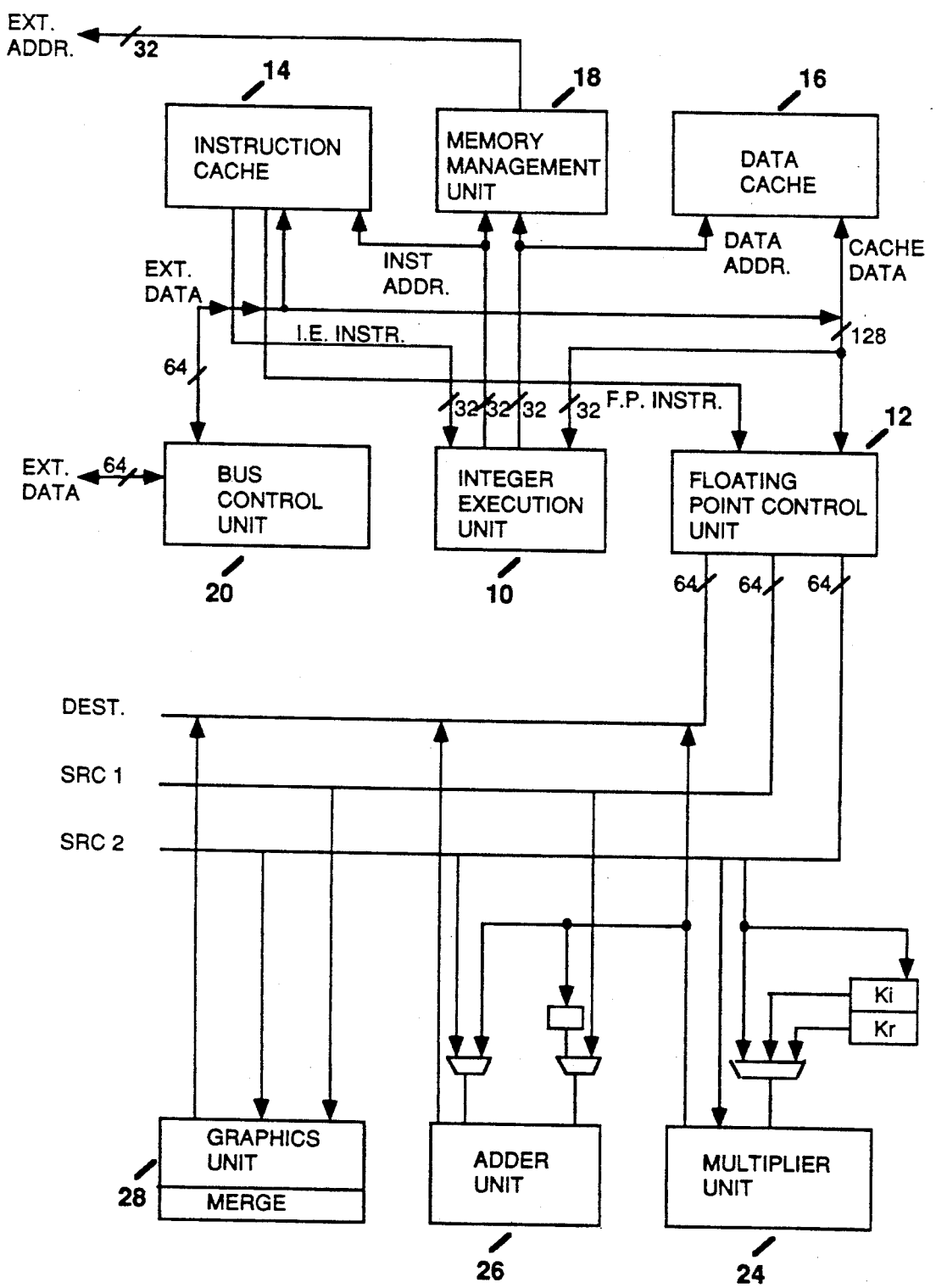
FIG. 1 is a block diagram showing the architecture of a high-speed processor in accordance with the teachings of the present invention.

Referring to FIG. 1, a block diagram is shown for illustrating the architecture of a high-speed processor suitable for using in the preferred embodiment of the present invention. An integer execution unit 10 and floating point control unit 12 are coupled to an instruction cache 14 and a data cache 16' respectively. The integer execution unit is further coupled to a memory management unit 18 which communicates with an internal bus of a computer for accessing the addresses of the data. The floating point control unit 12 communicates with a bus control unit 20 through which external data is transferred. The floating point control unit 12 is further coupled to a multiplier unit 24 as well as an adder unit 26 for performing floating point operations. In addition, a graphics unit 28 is further coupled to the floating point control unit 12 for providing high-speed multi-dimensional graphics. The integer execution unit is the central controller of the processor as shown in FIG. 1. The integer execution unit performs all 32-bit integer and data transfer operations. Moreover, it executes all control instructions from the instruction cache. The details, structures, and operations of the integer execution unit 10 will be described fully in detail below.

Figure 2:
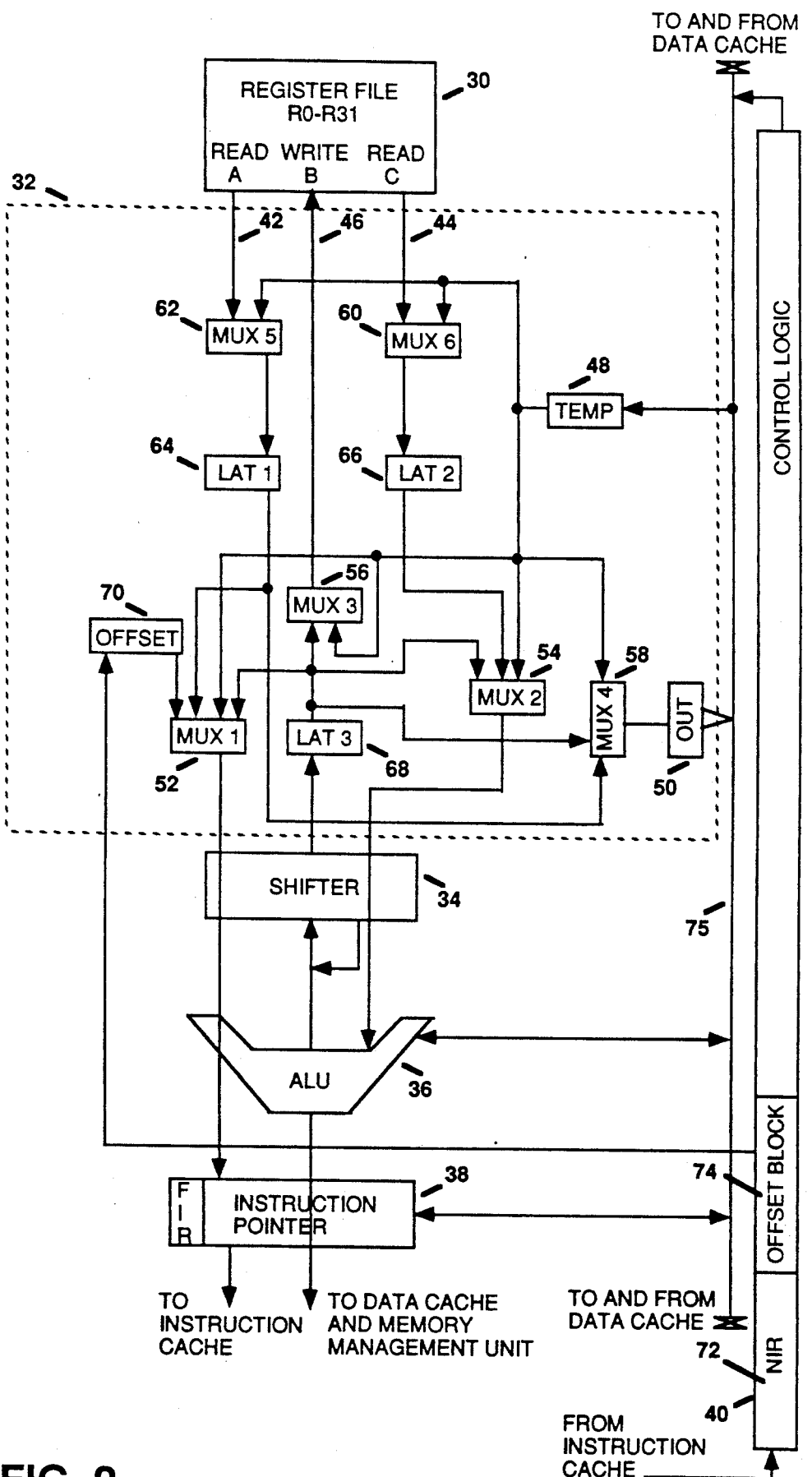
FIG. 2 is a block diagram illustrating the integer execution unit of the preferred embodiment of the present invention.

FIG. 2 is a block diagram of the integer execution unit of the present invention. The integer execution unit 10 is primarily responsible for fetching instructions for integer operation as well as instructions for the floating point control unit 12. The execution unit further decodes and executes integer, control, and load/store instructions. The integer execution unit 10 comprises a register file 30, a bypass control block 32, a shifter 34, and an Arithmetic Logic Unit (ALU) 36, instruction pointer 38, and a control logic unit 40. The register file 30 is coupled to the ALU 36 over the bypass control block 32 and the shifter 34. The ALU 36 is coupled to the instruction cache 14 and the memory management unit 18. The instruction pointer 38 is further coupled to the instruction cache 14. The control logic block 40 is coupled to the instruction cache 14 for receiving instructions therefrom. The control logic block 40 is further coupled to the bypass control block 32 over an internal bus 75. The internal bus 75 is a bi-directional bus permitting communication to and from the data cache 16. The ALU 36 is coupled to the data cache 16 over the internal data bus 75. The register file 30 comprises 32 registers, each 32-bit wide, R0-R31. The register file 30 is coupled to the bypass control block 30 over two read ports 42 and 44, respectively, and only one write port 46. Register R0 is read only with the value of 0. A write operation to register R0 is therefore ignored. The register file 30 is a write through register file, that is reading a register at the same time that the same register is being written causes the write data to appear on the read port. As such, under normal circumstances read and write operations on the register file 30 can occur simultaneously in every processor clock. For every read and write operation, the entire 32 bits of the register are read or written, no hardware sequencing is provided for reading or writing consecutive register addresses. The register file 30 is coupled to the bypass control block 32 over the read ports 42 and 44 and the write port 46. The bypass control block 32 comprises multiplexer 52, 54, 56, 58, 60 and 62. Furthermore, latches 64, 66, and 68 are coupled to the multiplexers for holding data for the register file and the ALU 36. Also provided is a temporary input register 48 and an output register 50. Finally, an offset latch 70 is coupled to the bypass control block 32. The bypass control block 32 communicates with the data cache 16 over the temporary register 48 and the data output register 50. The bypass control block also communicates with the register file 30 over multiplexers, 60 and 62, respectively. The ALU 36 is coupled to the bypass control block 32 over the shifter 34. The shifter 34 is a barrel shifter which performs bi-directional logic shift as well as arithmetic right shift on 32-bit operations. The ALU 36 is a 32-bit block comprising of an add/subtract circuit, a logical circuit and a data break comparator. The ALU 36 is fully disclosed in a pending United States Patent Application entitled "CARRY SELECT MULTIPLEXER", Ser. No. 07/429,562, filed Oct. 31, 1989. The ALU 36 is coupled to the data cache 16 and the memory management unit 18 over the instruction pointer 38. The instruction pointer 38 comprises a plurality of instruction pointer, a link register, and a Fault Instruction Register (FIR). The control logic block 40 comprises a Next Instruction Register (NIR) 72 and an offset block 74. The control logic block 40 communicates with the data cache 18 over the internal data bus 75.

Figure 3:
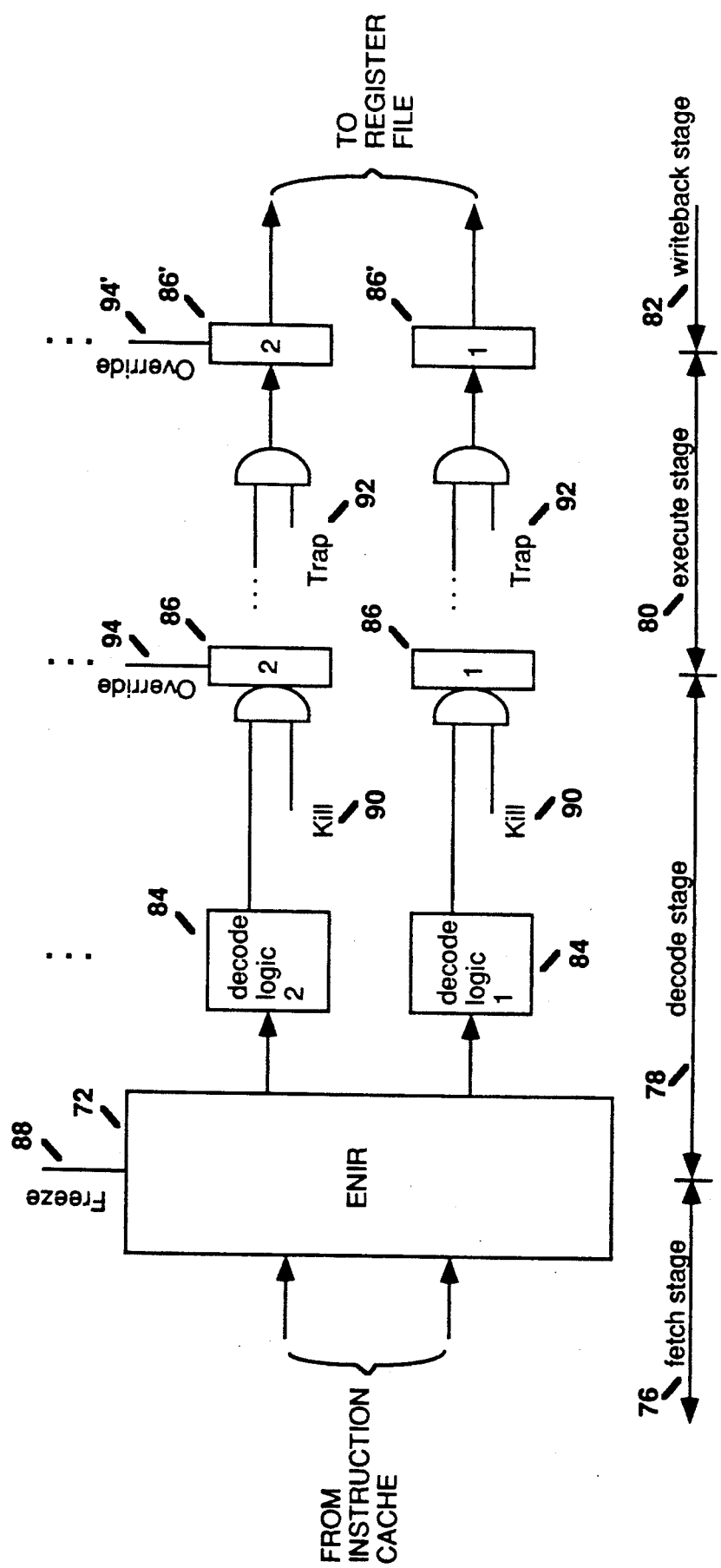
FIG. 3 is a circuit diagram illustrating the flow of the four-stage parallel instruction pipeline as each instruction is fetched, decoded, executed, and written back to the register file.

The integer execution unit 10 is primarily responsible for fetching instruction (integer and floating point) and decoding/executing integer, control and data transfer type instructions. To maximize the over-all performance of the processors, instructions are executed in four pipeline stages, namely Fetch, Decode, Execute, and Writeback. Each stage in the pipeline takes exactly one clock unless that stage is frozen. Referring to FIG. 3, it is a block diagram of the four parallel pipeline stages used in the preferred embodiment of the present invention. The four pipeline stages, namely Fetch, Decode, Execute and Writeback are identified as 76, 78, 80 and 82 respectively. Shown above the time line of the four pipeline stages is a process flow of a typical instruction as it is fetched from the instruction cache and fed through the four-stage parallel pipeline and written back into the register file. In fetch stage 76, the integer execution unit 10 calculates the instruction address and fetches one or two instructions. The instruction pointer block 38 in FIG. 2 contains the address of the instructions in Fetch. The Next Instruction Register (NIR) 72 is part of the instruction control unit 40. The NIR 72 is coupled to the instruction cache and is further coupled to a Freeze signal 88. An instruction whose address is pointed by the instruction pointer 38 will be fetched and latched into the NIR 72 if Freeze 88 is disabled. Instructions from the instruction cache 14 would not be latched into the NIR 72 if Freeze 88 is enabled. Freeze 88 may be generated by the integer execution unit 10, the floating point control unit 12, or the bus control unit 20. Freeze 88 is enabled when a cache miss occurs or a delay in the execution or writeback stage are required.

Referring again to FIG. 3, in the Decode stage 78, the instruction is decoded to determine the operation to be performed. Decode Logic 84 is coupled to the NIR 72 for receiving the instruction Fetch from the instruction cache. The Decode Logic 84 is further coupled to a plurality of latches 86. It should be understood by one skilled in the art that the Decode stage 78 comprises a plurality of decode logic gates 84 and latches 86. The simple case of two decode logic gates coupled to two latches are shown in FIG. 3 to illustrate the four-stage instruction pipeline used in the present invention and is not intended to serve as a limitation upon the present invention. All instructions received by decode logic gates 84 from the NIR 72 have a fixed width 32-bit format. The reduce-complexity instructions format of the present invention allows decoding with logic gates instead of the traditional PLA implementations. Thus, the simple and fast decoding of decode logic gates 84 allows a register access in the Decode stage 78 instead of the Execution stage 80.

In general, the instructions of a processor should allows the user to formulate any data processing task. The types of instruction can be classified as: (1) Data Transfer (e.g., Load and Store, etc.), (2) Arithmetic (e.g., Add, Subtract, Multiply and Divide), (3) Logic (e.g., AND, OR, NOT, etc.) and shifting functions, (4) input/output, (5) transfer of control. See Stallings, W. *Reduced Instruction Set Computers* (IEEE Computer Society Press: 1986), pp 1–7. With respect to the design of an integer execution unit, especially in reference to the number of write in a parallel pipeline stage processor, the data transfer type of instructions are the most complicated while the arithmetic and arithmetic logic type of instructions are the most simple. As such, for the rest of the disclosure, the load instruction shall refer to the data transfer type of instructions while the add instruction would represent the simpler arithmetic or logic type instructions.

Once the decode logic gates 84 determines the type of operation to be performed (whether it be load type or add type), the instruction is passed from the Decode stage 78 to the Execution stage 80 by having the decode logic gates 84 issue the instruction to the latches 86. The Kill signal 90 which is coupled to the latch 86 is a control signal for preventing or allowing the instructions to be issued from the Decode stage 78 to the Execute stage 80. The Kill signal 90 is active when there is a Freeze condition in the Decode stage 78 or when the integer execution unit 10 is out of synchronization with the NIR 72. In addition, new Fetch addresses are also computed in the Decode stage 78.

In the Execute stage 80, the actual operations specified by the instruction, for example Arithmetic, Logic, and Shift operations, are thus performed. For the load instruction there is no separate adder for address computations but rather the effective address for the load instruction is computed by the ALU 36 and sent to the memory management unit 18 and the data cache 16. The instructions in latches 86 will be performed in latches 86' if the Trap signal 92 is not active. However, the signals in the Execute stage 80 are not issued to the Writeback stage 82 if the Trap signal 92 remains active. This would prevent writes to the register file in the writeback stage 82. The override signals 94 and 94' are used to freeze the Execute stage 80 and writeback stage 82 for the special case of the load type instruction when it is being processed through the parallel pipeline.

In the writeback stage 82, the results of the Execute stage 80 are normally written into the destination register in the register file 110 as shown in FIG. 2. Access to data cache 16 and other control registers are also initiated during this clock. If Trap signal 92 is active in the Execute stage, writes to the register file 110 will be aborted. It follows that the results of the instructions will be written from latches 86' back to register file 110.

FIG. 4 is a timing diagram of an add instruction as it is processed by the instruction pipeline as described in FIG. 3. Shown on the left side column are the four instructions pipeline stages, Fetch, Decode, Execute, and Writeback. Because the integer execution unit can fetch one instruction per clock cycle, and given that there are four stages in an instruction pipeline, for the simple instruction such as add, the results will be written back into the register file 110 between the beginning and the end of the Writeback stage as shown in 96.

FIG. 5 is a timing diagram of a load type of instruction as it is being processed by the four-stage instruction pipeline of the present invention. In comparison with the add instruction as shown in FIG. 4, the load type instruction in FIG. 5 is more complicated by virtue of the fact that an additional address calculation is required in Step 97 in the Execution stage. Furthermore, the results of the load type instruction are written back into the register file until after the Writeback stage as shown in Step 98.

FIG. 6 is a timing diagram of an add instruction followed by a load type instruction as they are processed by the four-stage instruction pipeline of the present invention. The impact of the write port iof the register file when an add instruction is followed by a load instruction is illustrated by superimposing the timing diagram in FIG. 4 over that of a load type instruction in FIG. 5. Referring again to FIG. 6, an add type instruction is fetched, decoded, executed, and written back to the register file as shown in the dotted arrow 100. Similarly, the process of a load type instruction as it is fed to the four-stage pipeline of the present invention is shown in Steps 101 and 102 where the results of the load instruction is written back into the register file. Because the write operations of the add instruction and that of the load instruction occurred in Clock 5 of FIG. 6, a contention for the single write port of register file 110 arises. One of the novel features of the present invention is to couple the register file with a bypass control block, including a temporary register, TEMP, without having to add an extra write port to the register file. Thus, the result of a load following an add instruction is written into TEMP as shown in step 104.

Figure 7:
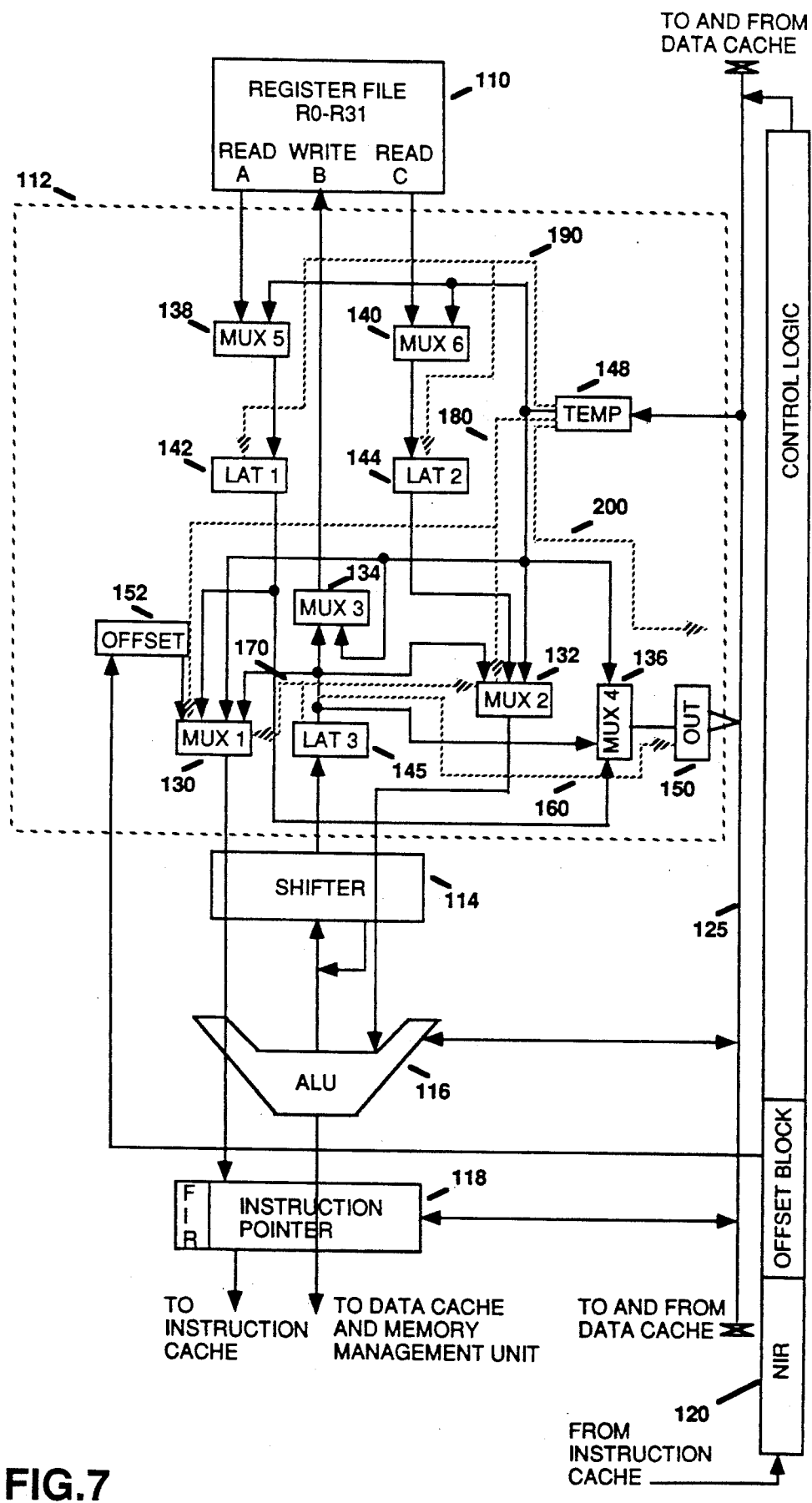
FIG. 7 is a block diagram showing the architecture of a high-speed processor in accordance with the teachings of the present invention.

FIG. 7 is a block diagram of a register file having one fewer write ports coupled to a unique bypass control unit as part of a processor. It should be understood by one skilled in the art that FIG. 7 is identical to the block diagram in FIG. 2, except for the numbering and the illustration of the bypass path 160, 170, 180, 190, and 200. The bypass control block is implemented such that the writing of the load type of instruction is delayed until the writeback stage of the next load type instruction. Usually, in the writeback stage the results are written back into the register file as soon as the instruction pipeline has completed processing that instruction. See steps 100 and 102 in FIG. 6. It was noticed that during the writeback stage of the load type instruction, there is nothing to write back into the register file 110. As such, the result of the load type instruction is held in a temporary register TEMP. See step 104 in FIG. 6. All the references to the results of the load type instruction will be bypassed from the TEMP register to the proper execution block. The data from the TEMP register is written back into the register file only at the writeback stage of the next load type instruction.

Referring now again to FIG. 7, there are three situations which require the bypass control block unit 112 to be activated in order to avoid the contention for the write port of the register file 110. If the destination of a load type instruction is referenced as a source operand in the next instruction immediately following a load type instruction, then the integer execution unit freezes one clock to avoid the load interlock. Bypass path 180 is required to resolve the contention for the write port in the register file 110. As such, the destination of the first load instruction is stored in TEMP 148. The destination results of the first load instruction is then sent directly to multiplexer 1 130 and multiplexer 2 132, respectively. Bypass path 180 allows data from the TEMP 148 to be used as the source operand for subsequent instructions. Although temporary register TEMP 148 usually contains the correct data to be bypassed during a freeze of the instruction pipeline data in the TEMP 148 may be overwritten accidentally. This would cause a subsequent load type bypass to select the wrong data from the TEMP 148 during the first cycle of the load bypass. Thus bypass path 190 is activated to prevent the accidental overwriting of the correct data in temporary register TEMP 148. Finally, if the source operand address of a store instruction matches the last load instruction's destination address, bypass path 200 will be activated. Bypass path 200 connects the temporary register TEMP 148 through multiplexer 4 136 to the data output register OUTPUT 150.

While the present invention has been particularly described with reference to FIGS. 1-7 and with emphasis on certain circuits and instructions, it should be understood that the figures are for illustration only and should not be taken as limitations upon the invention. In addition, it is clear that the method and apparatus of the present invention has utility in any application where the use of an integer execution unit in a processor is required. It is contemplated that many changes and modifications may be made by one of ordinary skill in the art without departing from the spirit and scope of the invention as disclosed above.

I claim:

1. In a processor having a plurality of memory cells, an integer execution unit, and a bus control unit for processing instructions, including data transfer instructions, in a parallel instruction pipeline, said pipeline including Fetch, Decode, Execute, and Writeback stages, the integer execution unit comprising:
   a register file comprising at least one write port for writing data and at least one read port for reading data, said register file further having a plurality of registers;
   a bypass control unit, connected to said read and write ports, for delaying writing of a result of a data transfer instruction into the register file through said write port until the writeback stage of a next data transfer instruction;
   a shifter, connected to said control bypass unit, for performing logical and arithmetic shift operations;
   an arithmetic logic unit ("ALU"), connected to said shifter, for calculating effective addresses for said instructions;
   an internal bus over which data is communicated;
   an instruction pointer unit, connected to the internal bus, for pointing to the effective address of a next instruction;
   an instruction control logic unit, connected to said control bypass unit over said internal bus, for storing the next instruction to be executed by said integer execution unit.

2. The integer execution unit defined by claim 1, said register file having a plurality of registers, said register file comprising at least 32 registers.

3. The integer execution unit defined by claim 2, said register file having at least two read ports and one fewer write port than the number of read ports.

4. The integer execution unit defined by claim 1, said bypass control unit further comprising a plurality of multiplexers coupled to a plurality of latches for holding data, a temporary input register connected to a first one of said multiplexers, and an output register connected to said first multiplexer.

5. The bypass control unit as defined by claim 4 being coupled to the said ALU and further to said register file for delaying said writeback stage without an extra write port of said register file.

6. The integer execution unit defined by claim 4, wherein said bypass control unit further comprises means for producing a first signal if a destination address of the result of said data transfer instruction is referenced as a source operand address of a next arithmetic/logic instruction, storing the result in said temporary input register in response to said first signal, and providing the result from said temporary input register to said ALU in response to said first signal.

7. The integer execution unit defined by claim 4, wherein said bypass control unit further comprises means for producing a second signal if a destination address of the result of said data transfer instruction is referenced as a source operand address of a next store instruction, storing the result in said temporary input register in response to said second signal, and providing the result from said temporary input register to said output register in response to said second signal.

* * * * *